Oct. 20, 1931.  W. A. CHRYST  1,828,357

SHOCK ABSORBER

Filed March 29, 1929.  2 Sheets-Sheet 1

Inventor
William A. Chryst
By Spencer, Hardman and Fehr.
Attorneys

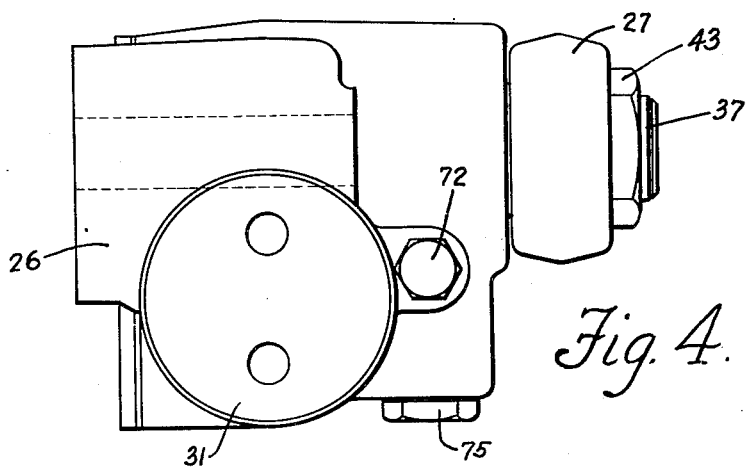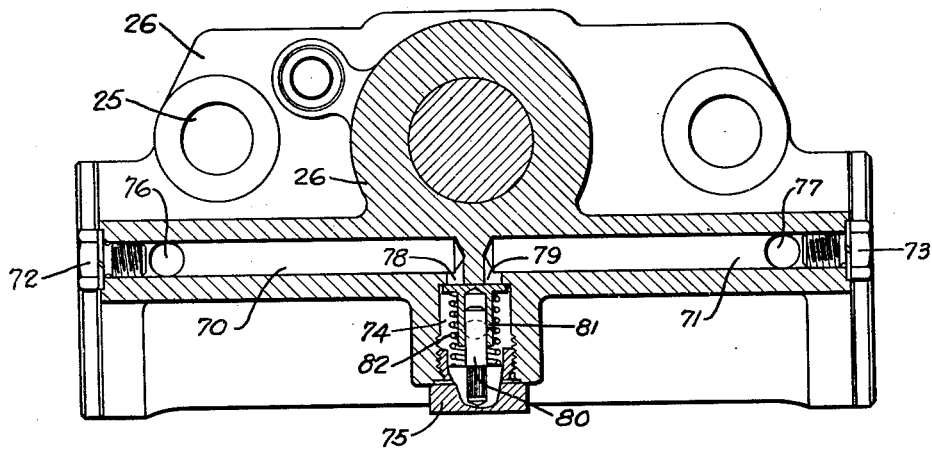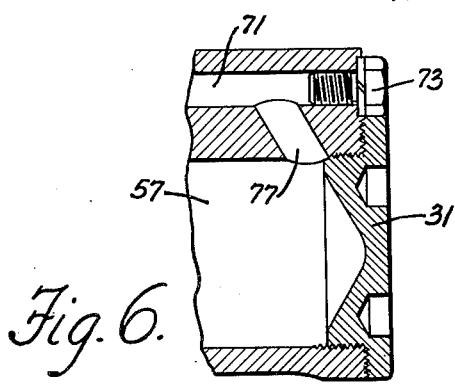

Patented Oct. 20, 1931

1,828,357

UNITED STATES PATENT OFFICE

WILLIAM A. CHRYST, OF DAYTON, OHIO, ASSIGNOR TO DELCO PRODUCTS CORPORATION, OF DAYTON, OHIO, A CORPORATION OF DELAWARE

SHOCK ABSORBER

Application filed March 29, 1929. Serial No. 351,031.

This invention relates to improvements in shock absorbers adapted to cushion the movements of two relatively movable members, for instance, the frame and axle of a vehicle.

It is among the objects of the present invention to provide a device adapted to control both the approaching and separating movements of the frame and axle of a vehicle, whereby jars and jolts, resulting from rebounding movements of said frame and axle, are substantially dissipated.

Another object of the present invention is to provide a shock absorber of simple structure and design, compact, and adapted to be attached on vehicles offering a limited space for such purposes.

Further objects and advantages of the present invention as herein disclosed, will be apparent from the following description, reference being had to the accompanying drawings, wherein a preferred form of the present invention is clearly shown.

In the drawings:

Fig. 4 is an end elevation taken from the left end of Fig. 2.

Fig. 5 is a longitudinal sectional view taken along the line 5—5 of Fig. 3.

Fig. 6 is a detail fragmentary sectional view showing a compression chamber as it is connected with a conduit in the casing.

Figure 1:
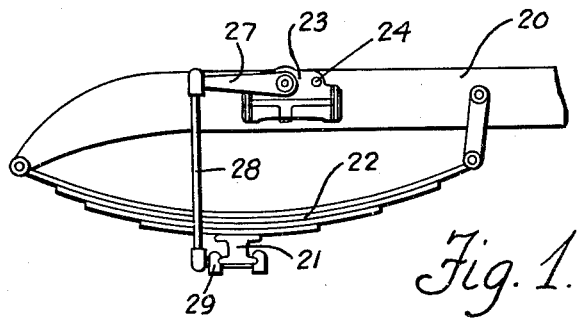
Fig. 1 is a fragmentary view of the front end of a vehicle chassis, showing the frame supported on the axle by springs, (only one of them being shown) the shock absorber attached to the frame including the features of the present invention.

Referring to the drawings, the numeral 20 designates the frame of the vehicle which is supported upon the axle 21 by springs 22, only one of which is shown.

The shock absorber, designated as a whole by the numeral 23, is secured to the frame 20 by bolts 24 passing through openings 25 provided in the casing 26 of the shock absorber. The operating arm 27 of the shock absorber has its free end connected to one end of the link 28, the other end of the link is attached to the axle 21 by the bracket-clamp 29.

The casing 26 of the shock absorber presents a cylindrical portion 30 open at both ends. These open ends of the shock absorber have covers 31 and 32 respectively, screw-threaded into their respective ends of the cylinder, a gasket between each cover and the casing providing a leak-proof joint, thus the cylindrical portion 30 of the casing is closed at both ends by said covers. The fluid reservoir or supply chamber 33 is in communication with the cylindrical portion 30 through the opening 34.

The casing 26 presents two bearing portions 35 and 36 coaxially aligned and on opposite sides of the fluid reservoir 33, in which is journalled the rocker shaft 37. A cover plate 38 provided with a gasket 39 is attached to the rear side of the casing by screws 40. A packing surrounds the shaft portion journalled in the bearing portion 36, said packing comprising a plurality of packing elements or rings 41, urged into sealing engagement with the shaft 37 by the packing gland 42 which fits snugly into a recess provided in the side of the casing 26. The shaft 37 extends from the casing 26 and has the shock absorber operating arm 27 secured thereto by knurls provided in the arm and on the shaft, removal of the arm from the shaft being substantially prevented by the lock nut 43. The rocker shaft 37 has an arm 48 inside the casing, which extends through the opening 34 into the cylindrical portion 30, the free end of the arm 48 being ball-shaped as at 49.

Figure 2:
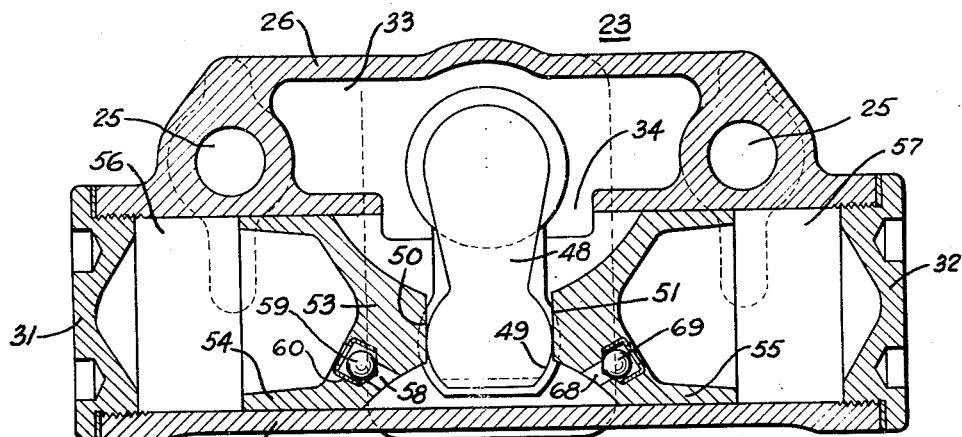
Fig. 2 is a longitudinal sectional view through the shock absorber, certain parts being shown in elevation for the sake of clearness.
Figure 3:
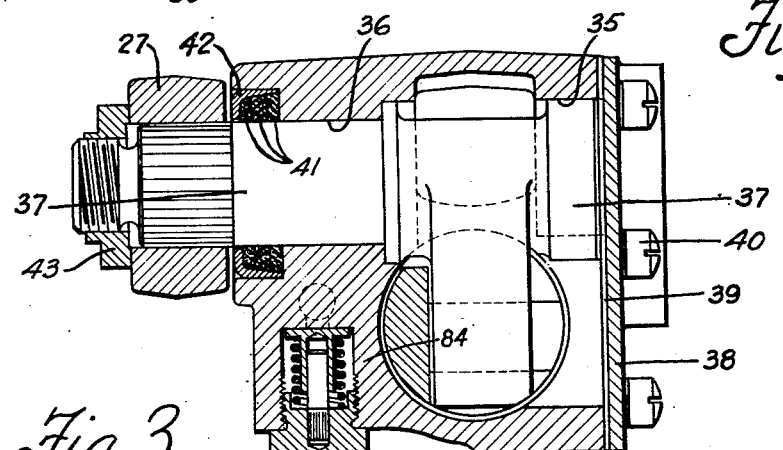
Fig. 3 is a transverse section taken along the line 3—3 of Fig. 2.

Within the cylindrical portion 30 there is provided a piston 53 having a central recess presenting surfaces 50 and 51 engaged by the ball-shaped end 49 of the arm 48 of the rocker shaft. Oscillation of the operating arm 27 of the shock absorber causes rocker shaft 37 to be oscillated, which results in similar movement of the arm 48, thus the piston 53 is reciprocated within the cylindrical portion 30 of the casing. As shown in Fig. 2, piston 53 has oppositely disposed head portions 54 and 55 which provide compression chambers 56 and 57 respectively at opposite ends of the cylindrical portion 30. In the piston head portion 54 there is provided a passage 58 which forms communication between the fluid reservoir 33 and the compression chamber 56. Passage 58 has two portions of different diameters, thus a valve-seat is provided in the passage 58 upon which a ball check-valve 59 is adapted to be seated when the piston 53 is moved toward end cover 31. A cage 60 is provided in the passage 58, said cage being apertured to permit fluid to flow therethrough, the cage, however, maintaining the ball check-valve 59 in said passage. Piston head portion 55 is provided with a similar passage, designated by the numeral 68, having the ball check-valve 69 controlling the fluid flow through said passage.

For purposes of description, the compression chamber 56 will be referred to hereinafter as the "compression check chamber" and the compression chamber 57 will be termed the "rebound check chamber".

The casing 26 is provided with conduits 70 and 71 shown in Fig. 5 to be in coaxial alignment. The inner ends of said conduits do not communicate with each other; the open ends of the conduits, however, terminate in the outer end walls of the casing. The open end of conduit 70 is closed and sealed by a screw-stud 72, while the open end of conduit 71 is sealed by a similar screw-stud 73. Adjacent the inner or non-communicating ends of the conduits 70 and 71 there is provided a recess 74 in the casing, the axis of which is substantially at right angles to the axis of the conduits 70 and 71. Interior screw threads are provided in the outer end of the recess 74 for receiving the screw plug 75 which closes and seals this outer end of recess 74 and thus forms a chamber. Conduit 70 is in communication with the compression check chamber 56 through a channel 76 provided in the casing 26. The rebound check chamber 57 is in communication with the conduit 71 through the pasage 77 in the casing. Conduit 70 is connected with the recess chamber 74 by the duct 78, while conduit 71 is in communication with recess chamber 74 through duct 79. Duct 79 may be of lesser transverse dimensions than the duct 78. Both ducts terminate in the bottom or end-wall of the recess chamber 74, which bottom or end wall provides a valve-seat.

The screw plug 75 carries a valve-stem 80 substantially coaxial of the recess chamber 74. A valve 81 is slidably supported upon said valve-stem 80, a spring 82 interposed between the valve and the screw-plug 75 yieldably urging the valve 81 into engagement with the bottom or end wall of the recess chamber 74 and thus normally closing ducts 78 and 79 whereby communication between conduits 70 and 71 is normally shut off. A passage 84 connects the fluid reservoir 33 with the portion of the recess chamber 74 behind valve 81, or more specifically with a portion of the recess chamber adjacent the inner end of the screw-plug 75 whereby fluid is permitted to escape from the rcess chamber 74, thereby substantially eliminating back pressure of the fluid from affecting efficient operation of valve 81.

The operation of the device is as follows:
When the wheels of the vehicle (not shown in the drawings) strike an obstruction in the roadway, the springs 22 will be flexed or compressed toward the frame 20, causing the link 28 to move the shock absorber operating arm 27 in a clockwise direction as regards Figs. 1 and 2, thus the piston 53 will be moved toward the left as regards Fig. 2 and fluid within the compression check chamber 56 will have pressure exerted thereupon, said pressure causing the ball check-valve 59 to be forced against its seat and thus substantially prevent any fluid from flowing through the passage 58 into the fluid reservoir 33. Pressure upon the fluid in compression check chamber 56 will be transmitted through passage 76, conduit 70 and duct 78 upon the valve 81, which pressure, when sufficiently high, will overcome the effect of spring 82 to hold the valve in duct closing position and thus the valve 81 will be moved to open communication between ducts 78 and 79 via the recess chamber 74. Valve 81 having been moved to open position, fluid will flow from duct 78 through the recess chamber 74 above valve 81 into duct 79 and thence through conduit 71 and passage 77 into the rebound check chamber 77, the piston head portion 55 of which is moving toward the left to increase the cubical contents of said rebound check chamber. The movements of the spring 22 toward the frame 20 on its compression stroke will be substantially resisted due to the fact that the flow of fluid past the valve 81 is substantially restricted, the resistance to the movement of spring 22 being directly comparable to the amount of restriction to the flow of fluid past valve 81.

When the spring 22 has reached the limit of its flexure or compression, it will tend to return to its normal unflexed position with a rebounding movement, however, as it begins to return a pull is exerted upon the link 28 which causes the arm 27 of the shock absorber to be moved in a counter-clockwise direction, resulting in a movement of the piston 53 toward the right as regards Fig. 2. In this instance the fluid within the rebound check chamber will have pressure exerted thereon, which pressure having reached a predetermined value and exerted through passage 77, conduit 71 and duct 79, will again move valve 81 from its seat and establish communication between the ducts 79 and 78 and consequently between the rebound check chamber 57 and the compression check chamber 56.

The valves 59 and 69 in passages 58 and 68 respectively are provided for purposes of replenishing the fluid supply in either of the compression chambers during the suction stroke of the piston, that is, when the piston head portion 54 moves away from the end cover 31, valve 59 may replenish the fluid supply in the compression check chamber, and when the piston portion 55 moves away from the end cover 32, the valve 69 will replenish the fluid supply in the rebound check chamber, said replenishing being necessary to compensate for any leakage in the compression chambers.

The effective resistance of the shock absorber to the movements of spring 22 may be varied by changing springs 82 of the pressure release valve, said springs when comparatively weak offering a comparatively lesser resistance to the movements of springs 22 than with comparatively stronger springs 82.

While the form of embodiment of the present invention as herein disclosed, constitutes a preferred form, it is to be understood that other forms might be adopted, all coming within the scope of the claim which follows.

What is claimed is as follows:

A shock absorber comprising, in combination, a casing providing a cylinder and a fluid reservoir; a piston in said cylinder, having two spaced piston head portions each forming a compression chamber at its respective end of the cylinder; a piston operating member engaging both piston head portions; a valve-chamber in the casing; a duct leading from each compression chamber into the valve-chamber; a valve normally shutting off communication between the ducts and the valve-chamber; and a check-valve in each piston for establishing a flow of fluid from the fluid reservoir into the respective compression chambers.

In testimony whereof I hereto affix my signature.

WILLIAM A. CHRYST.